United States Patent [19]

Wallace et al.

[11] 4,105,331
[45] Aug. 8, 1978

[54] VACUUM HEAD FOR FILM

[75] Inventors: Charles E. Wallace, Palos Verdes; Donald J. Farmer, Pacific Palisades, both of Calif.

[73] Assignee: Extek Microsystems, Inc., Van Nuys, Calif.

[21] Appl. No.: 800,764

[22] Filed: May 26, 1977

[51] Int. Cl.² .................. G03B 27/10; G03B 27/02
[52] U.S. Cl. ................................. 355/103; 355/132
[58] Field of Search ................. 355/132, 19, 78, 79, 355/90, 91, 103, 106, 108, 110, 19, 111, 97–100

[56] References Cited

U.S. PATENT DOCUMENTS

| 3,468,606 | 9/1969 | Wolf et al. | 355/91 |
| 3,595,561 | 7/1971 | Leblant | 355/97 X |
| 3,644,040 | 2/1972 | Beispel | 355/103 |
| 3,661,457 | 5/1972 | Frech | 355/78 |

Primary Examiner—Donald A. Griffin
Attorney, Agent, or Firm—Nilsson, Robbins, Dalgarn, Berliner, Carson & Wurst

[57] ABSTRACT

An apparatus and method to position a moving continuous strip master and a moving continuous strip duplicate for copying film images from the master to the duplicate. A vacuum is applied to a housing, the walls of which are partially formed by surfaces of longitudinally extending adjacent rollers. The master and duplicate are inserted through adjacent roller pairs and both sides exposed to a vacuum within the housing. The master and duplicate are removed from the housing with confronting surfaces in contact through a third adjacent roller pair. As a result of the vacuum created between the confronting strip surfaces and atmospheric pressure on opposite strip surfaces the relative position of the master to the duplicate is maintained until exposure to a light source is complete.

10 Claims, 7 Drawing Figures

VACUUM HEAD FOR FILM

FIELD OF THE INVENTION

The invention relates to copying transparent film images from a moving continuous strip master to a moving continuous strip duplicate, and more particularly to a vacuum head for positioning the master and duplicate and maintaining their registration until exposure has been

BACKGROUND OF THE INVENTION

Methods presently employed for obtaining and maintaining registration during the copying of film images from a moving continuous strip master to a moving continuous strip duplcate are many and varied. One method comprises exposure of the inner, emulsion surfaces of the master and duplicate to a vacuum as taught in U.S. Pat. No. 3,740,140 to Wolf, et al, as they are brought into registry and prior to irradiation by a light source. In such an apparatus, the enclosure in which the vacuum is created is partially formed by the moving master and duplicate film strips, thus requiring them to have a precise and known width with respect to solid side walls which form another portion of vacuum enclosure. As the duplicate and master are brought into registry, the vacuum created between the side walls and their respective confronting surfaces during registration results in atmospheric pressure on the opposite, non-confronting surfaces maintaining registration until the image on the master has been copied onto the duplicate during an exposure process.

In methods wherein vacuum is applied only to confronting surfaces of the master and duplicate, several problems have developed which limit the application of this potentially useful technique. One problem relates to tension variations between the master and duplicate film dispensing devices. In the technical arts, the term "shmoo" is used to define the ratio of tension on the film dispersed from a reel containing the strip master ($T_1$) and a reel containing a strip duplicate ($T_2$). As long as $T_1$ equals $T_2$ there is no problem. However, as the ratio $T_1/T_2$ or shmoo varies from one, the amount of vacuum required to maintain registration during the exposure process varies. In systems wherein the sides of the master and duplicate partially create a vacuum-containing enclosure, the shmoo is limited to values close to 1 due to a necessity to maintain a vacuum enclosure of substantially known dimensions. It is also required that the vacuum be limited to a predetermined level so that atmospheric pressure on the non-confronting master and duplicate film sides will not prematurely force the confronting surfaces into registration or, in some configurations, expose an aperture through which the vacuum is applied to the external atmosphere, thereby destroying the integrity of the vacuum created within the enclosure. In addition, present vacuum heads for film positioning systems require that the width of the master and duplicate be substantially equal and known in order to maintain the vacuum integrity of the enclosure. These systems are therefore very sensitive to film edge imperfections and splices whenever there is a lateral offset at the splice junction because of the vacuum destroying gaps created between such edge imperfections and junctions and the side walls forming the vacuum enclosure. For the same reason present systems cannot accommodate film with sprocket holes. Another shortcoming of prior systems is that bending manner differences introduced by film of different thicknesses require elaborate and expensive tension control devices due to the limited shmoo which can be tolerated as explained above.

The vacuum head film positioning apparatus disclosed herein greatly reduces or eliminates all of the above problems by exposing all film surfaces to the same vacuum conditions prior to their registration and subsequent exposure of the non-confronting surfaces to atmospheric pressure. This is accomplished through use of a housing in which a vacuum is maintained. The master and duplicate are inserted into the housing so that both sides of each are exposed to the vacuum and they are removed with their confronting longitudinal surfaces in substantially continuous contact. The vacuum between the confronting surfaces in conjunction with atmospheric pressure on the non-confronting surfaces subsequent to removal from the housing is sufficient to maintain the film in registration until an exposure process has been completed.

In a particular embodiment, the housing is formed of two side walls and of contiguous longitudinally extending rollers. Preferably, the rollers are formed with elastomeric surfaces. The master enters the housing through a first roller pair, the duplicate through a second roller pair and both are removed through a third roller pair which supplies the positioning necessary to bring the two film strips into contact with each other. Each roller is positioned so that film passing between any roller pair is in close contact therewith. In a particular embodiment, there are six rollers defining the circumference of the housing. The film removed through the third roller pair passes while still in registry, and is irradiated by, a light source in an exposure zone.

The apparatus provided herein overcomes the difficulties of the vacuum positioning heads used heretofore. Since both the master and duplicate film strips each pass through a roller pair, making sealing contact therewith, and have both sides thereof exposed to the same vacuum within the housing, a much larger shmoo can be accommodated because correct positioning of the film strip to the vacuum enclosure is no longer a requirement. In addition, problems related to splice mismatch, film edge imperfections and sprocketholed film become non-existant.

DETAILED DESCRIPTION

As required, a detailed illustrative embodiment of the invention is disclosed herein. This embodiment exemplifies the invention and is currently considered to be the best embodiment for such purposes. However, it is to be recognized that the vacuum head may be constructed in various other forms different from that disclosed. Accordingly, the specific structural details disclosed are representative and provide a basis for the claims which define the scope of the present invention.

As above indicated, the invention discloses a vacuum head for positioning a continuous strip master and a continuous strip duplicate so that they will be brought into registry and will remain registered until they have passed through an exposure zone. The invention accomplishes such registry by subjecting both the confronting and opposite surfaces of the master and duplicate to a vacuum, causing the confronting surfaces to become adjacent and then subjecting the opposite surfaces to atmospheric pressure which in turn supplies the opposing forces necessary to maintain the master and duplicate in registration until exiting an exposure zone.

Figure 1:
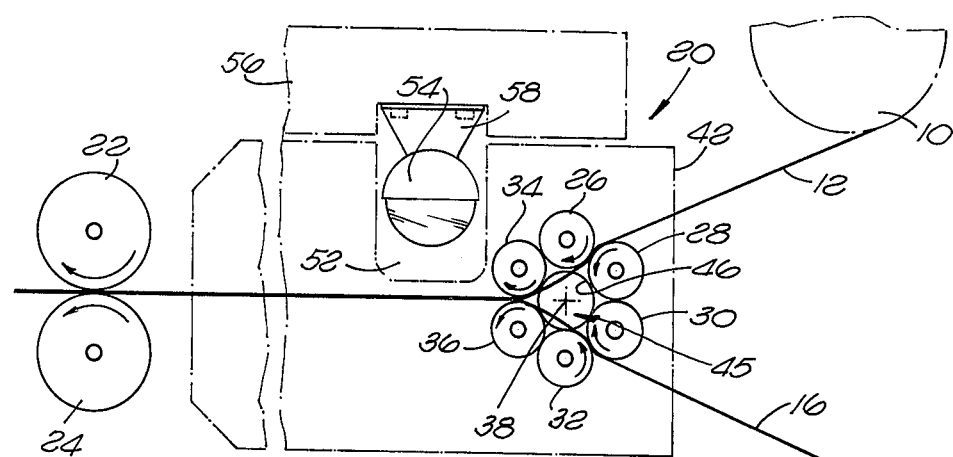
FIG. 1 is a diagrammatic view of an exemplary embodiment of an apparatus constructed in accordance with an embodiment of the present invention.

Referring to FIG. 1 the supportive and operative elements of the invention can be seen. A reel 10 containing a continuous strip master 12 having images to be copied and a reel 14 containing a continuous strip duplicate 16 to which images from the master 12 are to be copied supply input film to the vacuum head assembly 20. The film is drawn from the assembly 20 by an upper drive roller 22 and a lower idler roller 24 which are disposed so that their longitudinal surfaces bear on each other with sufficient force that non-sliding contact can be maintained between the upper roller 22, strip master 12, strip duplicate 16 and the lower roller 24. As the upper roller 22 rotates clockwise and the lower roller 24 counterclockwise (in the direction of drawing) the master 12 and duplicate 16 are drawn from their respective reels 10 and 14 through the vacuum head assembly 20. The fixed positioning of the vacuum head components in a manner to be explained in detail hereinbelow, and the exposure of each side of each film strip to vacuum, provides a shmoo which is limited only by the breaking point of the master or duplicate or the contact forces supplied by the upper 22 and lower 24 drive rollers during rotation.

The vacuum head assembly 20 includes six rollers, each formed with an elastomeric surface, comprising an upper master insert roller 26, lower master insert roller 28, upper duplicate insert roller 30, lower duplicate insert roller 32, upper removal roller 34 and lower removal roller 36. The rollers are disposed so that each longitudinal axis is one roller diameter or slightly less from each of two adjacent roller longitudinal axes. In the configuration shown, employing six rollers, the longitudinal axis of each roller is substantially one roller diameter from a centrally disposed point 38. The volume enclosed by the vacuum head roller surfaces and a first side wall 42 and a second side wall (44 of FIG. 3) into which the rollers are rotatably mounted in a manner to be explained below comprises a vacuum chamber through which the master and duplicate are passed. The first side wall 42 has a first aperture 46 and the second side wall 44 has a second aperture (48 of FIG. 3) located so that their peripheries are contained entirely within the chamber 45 created by the rollers and two side walls. Air is drawn from the chamber 45 through the two apertures 46 and 48 thereby creating a vacuum within the chamber 45. Other portions of the apparatus include an exposure zone 52, an incandescent light 54 disposed to irradiate the exposure zone 52 so that the master 12 and duplicate 16 are irradiated thereby as they pass through the exposure zone 52, and a cover plate 56 to which is removably attached a light holding fixture 58.

In operation, the master 12 enters the vacuum chamber 45 between the upper and lower master insert rollers 26 and 28 and the duplicate 16 enters between upper and lower duplicate insert rollers 30 and 32 with both master and duplicate being in sealing contact with their respective roller pairs. The master and duplicate are then drawn through the upper and lower removal rollers 34 and 36, again in sealing contact therewith, by the pulling forces created by the upper and lower rollers 22 and 24 as they rotate clockwise and counterclockwise, respectively. At the film contact points between master, duplicate and removal roller pairs, as a result of the film being drawn through the vacuum chamber 45, the upper rollers 26, 30 and 34 of each pair, rotate in a clockwise direction and the lower rollers 28, 32 and 36 of each pair rotate in a counterclockwise direction. Thus, the surfaces of each roller pair at the points of film contact are moving in the same direction as that of the film travel. With the above described rotations, the upper master insert roller 26 rotates in the same direction as the upper removal roller 34 and the lower duplicate insert roller 32 rotates in the same direction as the lower removal roller 36. As a result the surfaces of these adjacent rollers move in contra-rotation at their closest points. To accommodate this condition, these rollers are somewhat offset. However, an alternative design would be to place the rollers in contact so that they frictionally wear away just enough so that their opposing surfaces form a high impedance path through which air must pass in order to reach the vacuum chamber 45. Every other roller surface to roller surface interface occurs with the surfaces moving in the same direction at their closest point. This allows the rollers to be disposed so that there is a slight compressive force between opposing surfaces and a resulting sealing action which maintains the vacuum integrity of the vacuum chamber 45.

The foregoing method of operation presumes that the master and duplicate have been properly threaded through the apparatus. An efficient method for loading of the film is as follows. A desirable test strip of film is first pushed straight through the junction created by the lower master insert roller 28 and the upper duplicate insert roller 30, through the vacuum chamber 45, and out through the upper and lower removal rollers 34 and 36. Approximately 1 foot of film is pushed through. The duplicate (or master) film strip is then pushed through its roller pair (in this case, 30 and 32) until it abuts against the test strip and the lower removal roller 36. The test strip is now pulled back out through its input roller pair 28 and 30. As the test strip is pulled back out, the surprising result is that the pressure produced on the end of the duplicate 16 due to the action of its insert rollers 30 and 32 is sufficient to slidably force the end outward between the lower removal roller 36 and the backwardly moving test strip. After the test strip is removed, the master can be easily inserted through its insert rollers 26 and 28 and then drawn outward between the duplicate 16 and the upper removal roller 34 merely by continuing to pull the duplicate through the vacuum head assembly.

Figure 1A:
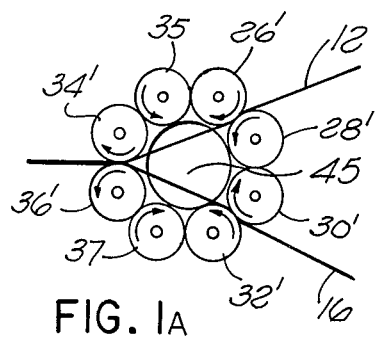
FIG. 1A is a diagrammatic view of an alternative configuration of the vacuum head rollers.

Referring to FIG. 1A, there is shown an alternate configuration for the vacuum head rollers in which eight rollers are used. In this configuration, insertion of idler rollers between adjacent insert and removal rollers allow all rollers to rotate in compatible directions. The assembly includes an upper master insert roller 26', lower master insert roller 28', upper duplicate insert roller 30', lower duplicate insert roller 32', upper removal roller 34', an upper idler roller 35 between the upper master insert roller 26' and upper removal roller 34', a lower removal roller 36' and a lower idler roller 37 between the lower duplicate insert roller 32' and lower removal roller 36'. The rollers 26', 28', 30', 32', 34', 35, 36' and 37 are disposed with side walls (not shown) to form a vacuum chamber 45'. Operation is similar to that described with respect to FIG. 1 wherein a master enters the vacuum chamber between the upper and lower master insert rollers 26' and 28', a duplicate 16 enters between upper and lower duplicate insert rollers 30' and 32' and both master and duplicate are drawn through the upper and lower removal rollers 34' and 36'.

Figure 2:
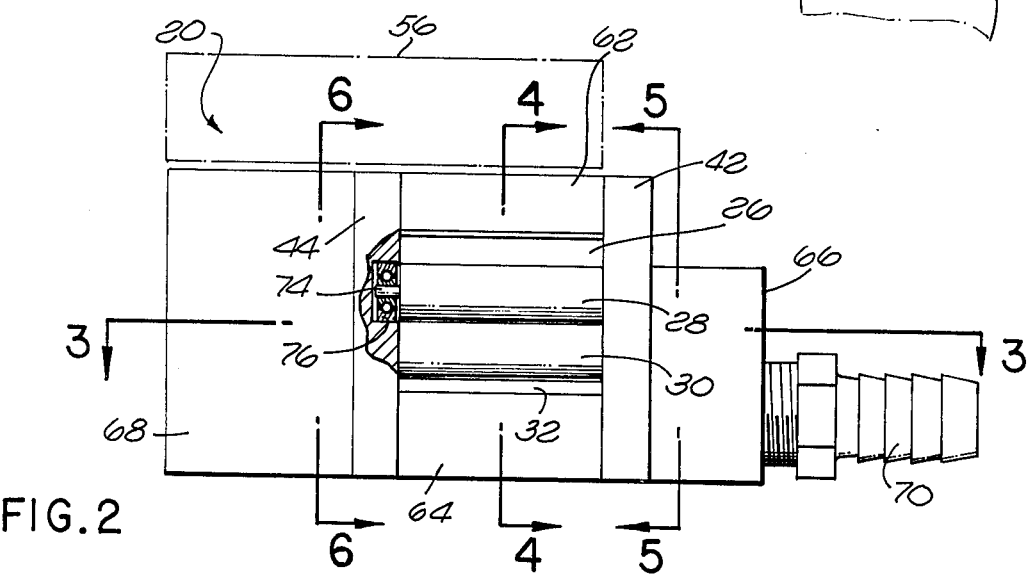
FIG. 2 is a rear elevational view showing the master and duplicate roller pairs and the vacuum drawing device interface.

Referring to FIG. 2, the relationship between the two side walls 42 and 44 to the roller ends can be seen. The rollers are mounted so that their ends are adjacent each side wall 42 and 44 inner surface. An upper guide bar 62 is provided to facilitate insertion of the master 12 between the master insert roller pair 26 and 28. Similarly, a lower guide bar 64 is provided for insertion of the duplicate 16 between the duplicate insert roller pair 30 and 32. A first vacuum manifold 66 is attached to the first side wall 42 and a second vacuum manifold 68 is attached to the second side wall 44. A vacuum drawing device (not shown) is attached to an adaption fixture 70 one end of which screws into the first vacuum manifold 66 and the other end of which is adapted to slidably receive a hose which connects to the vacuum drawing device. The adaption fixture 70 interfaces with channeling within the apparatus, to be described hereinbelow, through which air is removed from the vacuum chamber 45. As shown in the cutaway portion of FIG. 2, a pin 74 extends from an end of the lower master insert roller 28 and is centered at the axis of rotation. The pin is supported by a bearing 76 which is frictionally mounted into a cavity partially extending into the second side wall 44 so that it is flush with the side wall 44 surface adjacent the roller 28 end. Each roller end is configured in an identical manner as the end above described with the pin centers of each roller being at substantially the same angular radial displacement from the centrally disposed point 38 shown in FIG. 1.

Figure 3:
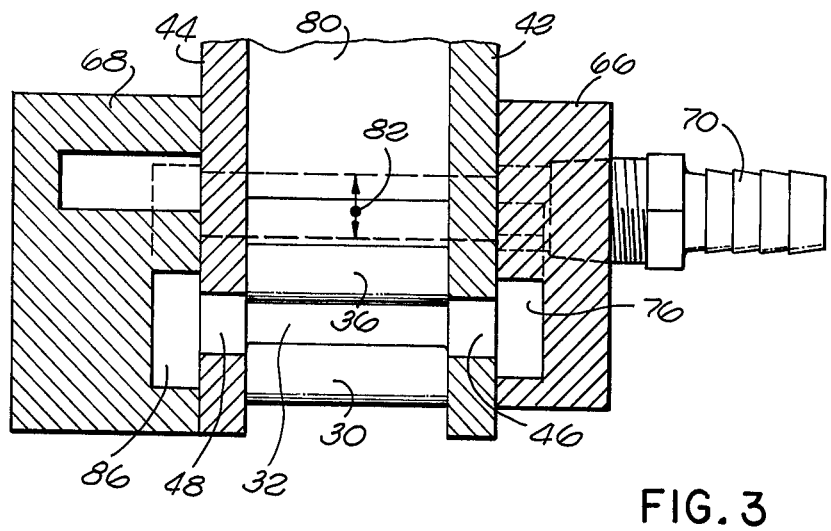
FIG. 3 is a sectional view taken along line 3—3 of FIG. 2 showing channeling used to draw a vacuum within the housing.

Channeling through which air is withdrawn from the vacuum chamber 45 is shown in FIG. 3. The adaption fixture 70 draws from a cavity 76 in the first vacuum manifold 66 inner wall which extends upward to the first aperture 46 in the first side wall 42. The first vacuum manifold 66 and first side wall 42 are mounted in sealing contact with each other by bolts (not shown) so that air is drawn from the vacuum chamber 45 through the first aperture 46 and the first vacuum manifold cavity 76 by the vacuum drawing device. A lower cross member 80 extending the length of the apparatus is provided which, in conjunction with the upper guide bar 62 and lower guide bar 64 provide support and alignment for the side walls 42 and 44. A circular bore 82 extending widthwise through the lower cross member 80 is disposed so that it will connect the cavity 76 formed within the first vacuum manifold 66 whith a cavity 86 formed within the second vacuum manifold 68 inner wall and extends upwardly to the second aperture 48 in the second side wall 44. Thus, air is also drawn from the vacuum chamber 45 through the second aperture 48, the second vacuum manifold cavity 86, and the circular bore 82 by the vacuum drawing device. This air evacuation from apertures located on each side of the vacuum chamber 45 tends to equalize the pressure therein and produces more uniform registration characteristics of the removed film strips.

Figure 4:
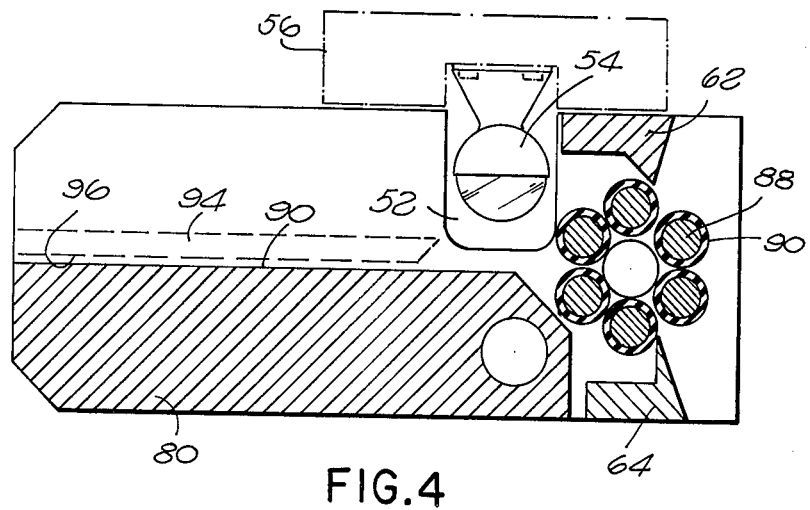
FIG. 4 is a sectional view take along line 4—4 of FIG. 2 showing the six rollers and the housing formed thereby.

Further details of the construction can be seen in FIG. 4 which shows a vertical longitudinal cross-section of the apparatus. The roller construction consists of a centrally disposed core 88 with the surface 90 being of material with elastomeric properties such as rubber. The upper and lower guide bars 62 and 64 are positioned so that the master 12 and duplicate 16 will be guided to their respective insert rollers. The lower cross member 80 has an upper surface 90 which supports the film as it is threaded from the exposure zone 52 to the drive rollers 22 and 24. A further embodiment of the apparatus includes a guide plate shown in shadow at 94, which is mounted between the first and second side walls 42 and 44 and extends longitudinally from the end of the exposure zone 52 to the end of the lower cross member 80. The guide plate lower surface 96 is positioned sufficiently high above the cross member upper surface 90 to allow the master and duplicate film pair 12 and 16 to pass through the cavity created thereby, but sufficiently low to prevent coiling or twisting of the film pair. It has been found that the guide plate 94 is helpful with 16 mm film but is not required for film which is 35 mm or wider.

Figure 5:
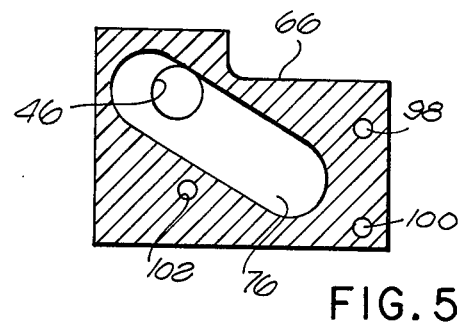
FIG. 5 is a sectional view taken along line 5—5 of FIG. 2 showing a first vacuum manifold.
Figure 6:
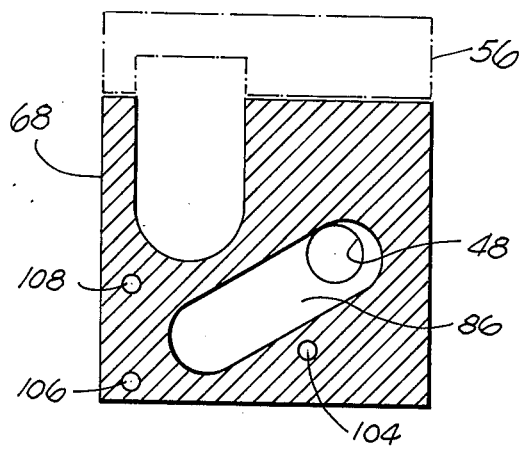
FIG. 6 is a sectional view taken along line 6—6 of FIG. 2 showing a second vacuum manifold.

Details of the first vacuum manifold 66 are shown in FIG. 5. The cavity 76 contained therein extends backwards and upwards and completely overlaps the aperture 46 contained in the first side wall 42. Three holes 98, 100 and 102 are provided through which bolts can be inserted for attachment to the first side wall 42 into which receiving holes have been tapped and appropriately threaded. Details of the second vacuum manifold 68 are shown in FIG. 6 wherein the cavity again slopes upward and backwards and overlaps the second aperture 48 contained in the second side wall 44. Three holes 104, 106 and 108 are again provided for attachment.

As can be appreciated, the apparatus can be adapted to receive any film width by selecting the appropriate widths for the rollers, upper and lower guide bars and lower cross member. It has been found that for a 16 mm or 35 mm width, a vacuum of 4 in. Hg or greater in the vacuum chamber 45 is sufficient. Furthermore, vacuums of over 20 in. Hg will also work equally well and the master and duplicate film thickness may vary from under 0.002 in. to over 0.007 in., all exclusively or in conjunction, with no detrimental effect. It should be noted that it is the differential pressure that provides the key to the success. Thus, chamber 45 could be at atmospheric pressure if the surrounding area were pressurized.

What is claimed is:

1. In an apparatus for copying of transparent film images from a moving continuous strip master to a moving continuous strip duplicate, including an exposure zone containing a light source for irradiating said master and said duplicate and means for positioning said master and duplicate during said continuous movement, the improvement according to which said positioning means comprises:
- a housing;
- means for insertion of said master into said housing;
- means for insertion of said duplicate into said housing;
- means for removal of said master and duplicate from said housing with confronting longitudinal surfaces of said master and duplicate in substantially continuous contact; and,
- means for accomplishing relatively low pressure within said housing, both between said confronting surfaces and on surfaces of both said master and said duplicate which are opposite said confronting surfaces, compared to pressure outside said housing whereby as said master and duplicate pass from said housing, non-sliding contact between said confronting longitudinal surfaces is maintained by the pressure outside said housing on said surfaces at least until said contacting surfaces pass through said exposure zone.

2. The apparatus of claim 1 wherein said housing is formed by two opposite side walls and a plurality of longitudinally extending rollers between said side walls.

3. The apparatus of claim 2 wherein said master insertion means comprises a first adjacent pair of said rollers, said master moving in close contact therewith.

4. The apparatus of claim 3 wherein said duplicate insertion means comprises a second adjacent pair of said rollers, said duplicate moving in close contact therewith.

5. The apparatus of claim 4 wherein said means for removal of said master and duplicate from said enclosure comprises a third adjacent pair of said rollers, said master and duplicate moving in close contact therewith.

6. The apparatus of claim 5 in which one of said first pair of rollers is positioned closely adjacent one of said third pair of rollers and one of said second pair of rollers is positioned closely adjacent the other of said third pair of rollers, the confronting surfaces of said rollers moving in opposite directions.

7. The apparatus of claim 2 wherein there are at least six of said rollers.

8. The apparatus of claim 2 wherein said rollers have elastomeric surfaces.

9. The apparatus of claim 1 wherein said means for accomplishing said relatively low pressure within said enclosure comprises applying a vacuum through a port in at least one of said opposite side walls.

10. A method for copying film images from a moving continuous strip master to a moving continuous strip duplicate, the steps comprising:
- inserting said master into a housing;
- inserting said duplicate into a housing;
- removing said master and duplicate from said housing with confronting longitudinal surfaces of said master and duplicate in substantially continuous contact;
- exposing said master and duplicate to light irradiation in an exposure zone; and,
- establishing a pressure differential between regions within and without said housing whereby to provide a relatively low pressure, both between confronting surfaces and on surfaces of both said master and said duplicate which are opposite said confronting surfaces, whereby as said master and duplicate pass from said housing, non-sliding contact between said confronting surfaces is maintained by relatively high pressure on said opposite surfaces at least until said contacting surfaces pass through said exposure zone.

* * * * *

UNITED STATES PATENT AND TRADEMARK OFFICE
CERTIFICATE OF CORRECTION

PATENT NO. : 4,105,331
DATED : August 8, 1978
INVENTOR(S) : Charles E. Wallace et al It is certified that error appears in the above-identified patent and that said Letters Patent are hereby corrected as shown below:

Column 1, line 10, after "been" add --completed.--.
Column 1, line 16, change " duplcate" to --duplicate--.

Signed and Sealed this

Tenth Day of April 1979

[SEAL]

Attest:

RUTH C. MASON
Attesting Officer

DONALD W. BANNER
Commissioner of Patents and Trademarks